United States Patent [19]
McLearie et al.

[11] Patent Number: 5,302,192
[45] Date of Patent: Apr. 12, 1994

[54] ANTI-FOULING COATING COMPOSITIONS

[75] Inventors: James McLearie; Alistair A. Finnie, both of Tyne and Wear; Adrian F. Andrews, Northumberland; Ian S. Millichamp, Tyne and Wear; Alexander Milne, Newcastle upon Tyne, all of England

[73] Assignee: Courtaulds Coatings (Holdings) Limited, London, England

[21] Appl. No.: 916,158

[22] PCT Filed: Dec. 21, 1990

[86] PCT No.: PCT/GB90/02019
§ 371 Date: Jul. 31, 1992
§ 102(e) Date: Jul. 31, 1992

[87] PCT Pub. No.: WO91/09915
PCT Pub. Date: Jul. 11, 1991

[30] Foreign Application Priority Data
Dec. 22, 1989 [GB] United Kingdom ............... 8929111
Dec. 5, 1990 [GB] United Kingdom ............... 9026392

[51] Int. Cl.$^5$ .................. C09D 5/14; C09D 5/16
[52] U.S. Cl. ...................... 106/18.33; 106/15.05; 106/18.34; 424/78.09; 523/122; 514/494; 514/499; 514/642; 514/665; 524/159; 562/104
[58] Field of Search ........... 106/18.33, 18.34, 15.05; 424/78.09; 71/67; 514/642, 665, 494, 499; 562/104; 524/159; 523/122; 427/384

[56] References Cited

U.S. PATENT DOCUMENTS

| | | | |
|---|---|---|---|
| 3,281,452 | 10/1966 | Kapar | 106/18.33 |
| 3,288,555 | 11/1966 | Napier et al. | 106/14.44 |
| 4,818,797 | 4/1989 | Tsuda | 525/329.9 |
| 4,904,742 | 2/1990 | Perichaud et al. | 525/331.4 |

FOREIGN PATENT DOCUMENTS

0232006A2  8/1987  European Pat. Off.
0270465A1  6/1988  European Pat. Off.
1482252    8/1977  United Kingdom.

Primary Examiner—Anthony Green
Attorney, Agent, or Firm—Nixon & Vanderhye

[57] ABSTRACT

The present invention relates to an anti-fouling coating composition that comprises a marine biocide and a binder which is a hydrolyzable film-forming seawater-erodible polymer. The polymer contains sulphonic acid groups in quaternary ammonium salt form.

19 Claims, No Drawings

ANTI-FOULING COATING COMPOSITIONS

This invention is concerned with anti-fouling coating compositions. Anti-fouling coatings are used on surfaces likely to come into contact with marine fouling organisms such as algae, seaweed and barnacles, for example on ships or boats or on the outfalls for water from power stations. Such coating compositions generally comprise a biocide for marine organisms and a binder polymer.

The most successful anti-fouling paints in recent years have been self-polishing anti-fouling paints using binders which are hydrolysable polymers containing pendant side groups which are liberated from the polymer by reaction with seawater, the residual polymer being sufficiently dispersible or soluble in seawater to be swept away from the paint surface, exposing a fresh layer of the binder able to undergo a similar reaction with seawater. Such paints are described for example in British Patent 1,457,590. The well-known benefits of such self-polishing paints are that the paint film tends to at least retain its initial smoothness and that the biocide contained in the paint is delivered from the surface at a more uniform or constant rate.

The only commercially significant self-polishing paints employ binders which contain triorganotin ester groups. The triorganotin provides some of the biocidal action of the paint and the triorganotin ester readily undergoes the hydrolysis on which the self-polishing action is dependent. The biocidal activity can be augmented by other anti-fouling substances dispersed or dissolved in the paint film. There may be advantages in using other hydrolysable groups, which are not necessarily biocidal, in place of triorganotin, both for cost reasons and because the powerful biocidal effects of triorganotin may not be desired. There has been concern about the environmental effect of triorganotin biocides released from yachts in particular.

International Patent Application WO84/02915 discloses an anti-fouling paint having a hydrolysable film-forming water-insoluble seawater-erodible polymeric binder having recurring groups represented by the formula

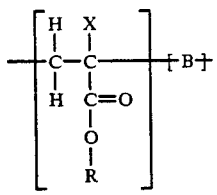

where X is hydrogen or methyl and R is a substituted alkyl, aryl, aralkyl or triorganosilyl moiety and B is the residue of an ethylenically unsaturated comonomer. WO84/02915 describes a wide range of groups R, such as benzyl, aminoalkyl, haloalkyl and trialkylsilyl groups. Other self-polishing copolymer paints which release non-biocidal moieties are described in EP-B-69559 and EP-A-232006.

U.S. Pat. No. 4,818,797 describes new quaternary ammonium salts of polyacrylates to prevent accumulation or attachment of marine organisms on ships' hulls.

GB Patent 1,482,252 describes polymers made by polymerising amine salts or quaternary ammonium salts of acrylamidoalkane sulphinic acids. The polymers are useful in rust-preventive coatings, dispersants and viscosity modifiers.

An anti-fouling coating composition according to the invention comprises a marine biocide and a binder which is a hydrolysable film-forming seawater-erodible polymer, characterised in that the polymer contains sulphonic acid groups in quaternary ammonium salt form.

The polymer used as binder is preferably prepared by reaction of a polymer containing sulphonic acid or salt groups with a quaternary ammonium hydroxide or salt. The polymer used as binder can alternatively be prepared by polymerisation of a quaternary ammonium salt of an ethylenically unsaturated sulphonic acid. As a further possibility, the quaternary ammonium moiety may be introduced by reaction of a sulphonate ester, for example, a methyl ester, with a tertiary amine. The sulphonate ester may be in monomeric or polymeric form. If the ester is in monomeric form, the resulting quaternary ammonium sulphonate monomer is then polymerised to form a polymeric binder for use according to the invention.

The binder polymer is preferably a linear addition copolymer containing the sulphonic acid salt functionality in groups pendant to the polymer backbone.

Examples of monomers which can be used in preparing a sulphonic acid functional copolymer are styrene sulphonic acid and, preferably, aliphatic sulphonic acid monomers such as 2-acrylamido-2-methyl-propane sulphonic acid (AMPS), vinyl sulphonic acid, methallyl sulphonic acid, propenesulphonic acid or 2-sulphoethyl methyacrylate. Particular mention may be made of non-aromatic sulphonic acid monomers, and of aromatic sulphonic acid monomers other than styrene sulphonic acid.

Preferably, the equivalent weight of the polymer calculated as free sulphonic acid groups is in the range of from 600 to 4000, and is more especially in the range of from 900 to 2000.

The copolymer generally contains 3 to 30% by weight of the sulphonic acid monomer (more especially at least 5% by weight) to give the preferred equivalent weight of 600 to 4000, advantageously 10 to 20% by weight sulphonic acid monomer to give an equivalent weight of 900 to 2000.

Advantageously, the proportion of quaternary ammonium sulphonate monomer in the binder polymer according to the invention is in the range of from 3 to 30 mol %, for example, from 5 to 30 mol %. Particular mention may be made of polymers having a quaternary ammonium sulphonate monomer content of less than 12.5 mol % (e.g. 12 mol % or less) and also those where the quaternary ammonium sulphonate monomer content is above 15 mol % (e.g. 15.5 mol % or greater).

A sulphonic acid monomer is advantageously copolymerised with an ethylenically unsaturated comonomer, which may be an aliphatic comonomer, for example an acrylic ester or amide such as methyl acrylate, methyl methacrylate, ethyl acrylate, butyl acrylate or 2-ethylhexyl methacrylate, methoxyethyl acrylate, acrylonitrile, vinyl acetate, vinyl butyrate, or vinyl chloride. Alternatively, styrene or vinyl pyridine may be used as a comonomer. Two or more comonomers may be used as desired. For example, a sulphonic acid monomer may be copolymerised with methyl methacrylate and butyl acrylate, or with ethyl methacrylate and methoxyethyl acrylate.

If the copolymer contains a relatively low proportion of sulphonic acid groups (for example, 5 mol % or less) it may also contain carboxylic acid groups derived for example from acrylic or methacrylic acid, or groups which are hydrolysed by seawater to carboxylic acid or salt groups.

Polymerisation of the sulphonic acid is preferably carried out in a polar organic solvent using a free radical initiator, for example an azo compound such as azobisisobutyronitrile or a peroxide such as benzoyl peroxide. The polar organic solvent can, for example, be a ketone such as methyl isobutyl ketone, methyl ethyl ketone or methyl isoamyl ketone, an ester such as butyl acetate, methoxy-propyl acetate or ethoxyethyl acetate, an alcohol such as butanol or an ether alcohol such as butoxyethanol. Mixtures of a polar organic solvent with a hydrocarbon, for example an aromatic hydrocarbon such as xylene, can be used. The sulphonic acid can be polymerised in free acid or salt form.

The number average molecular weight Mn of the sulphonic acid copolymer is generally in the range 1,000 to 50,000. Most preferably the Mn is 5,000 to 50,000 but oligomeric copolymers of Mn for example 1,000 to 5,000 can be used in high solids systems.

The weight average molecular weight of the sulphonic acid copolymer is generally in the range of from 1000 to 200 000, more especially at least 1500, and is preferably in the range of from 5000 to 60 000.

The molecular weight can be controlled by the amount of initiator used and if desired by the use of a chain transfer agent.

If the sulphonic monomer has very limited solubility in organic solvents, for example if it is AMPS, polymerisation can be carried out in water, but it is preferred to form a monomeric quaternary ammonium salt and to copolymerise this in a polar organic solvent.

Alternative sulphonic acid polymers are telechelic polymers which can be prepared for example by reacting telechelic amine-functional polymers with an ethylenically unsaturated sulphonic acid such as AMPS by Michael addition.

The quaternary ammonium salt groups can be formed by reaction of a polymer containing sulphonic acid or salt groups with a quaternary ammonium hydroxide or salt such as a carbonate, bicarbonate or halide. For example, an alkali metal salt of a sulphonic acid functional polymer can be reacted with a quaternary ammonium salt formed from a tertiary amine and an alkylating agent such as an alkyl halide, preferably methyl bromide or methyl iodide. The reaction is preferably carried out in a polar organic solvent. Generally, it is preferred to use the same solvent as for polymerisation so that the reaction to form the quaternary ammonium salt can be carried out in a solution of the polymer as formed. The solvent is preferably such that the sulphonic acid polymer salt is soluble but the alkali metal halide formed is insoluble and is precipitated. Alternatively, a sulphonic acid polymer in free acid form can be reacted with a quaternary ammonium hydroxide, carbonate or bicarbonate. The equivalent ratio of sulphonic acid or salt groups to the quaternary ammonium compound is preferably in the range 0.8:1 to 1.5:1.; the reagents are preferably used in a stoichiometric amount or with a small excess of the quaternary ammonium compound.

Where a polymer containing sulphonic acid groups in alkali metal salt form is used, it is preferably prepared by neutralisation of a polymer containing sulphonic acid groups with an alkali metal hydroxide, carbonate or bicarbonate. It can alternatively be prepared by copolymerisation of a monomeric sulphonic acid salt, for example sodium styrene sulphonate or AMPS sodium salt, with one or more comonomers selected from those listed above.

A quaternary ammonium sulphonate monomer can be prepared by reaction of a sulphonic acid or salt with a quaternary ammonium hydroxide or salt using the reaction conditions described above for reaction of sulphonic acid or salt polymers. The quaternary ammonium sulphonate monomer is advantageously then copolymerised with one or more comonomers selected from those listed above. Generally, it is preferred to use the same solvent for preparation of the quaternary ammonium sulphonate polymer and for the subsequent polymerisation.

Mention may be made of processes in which the quaternary ammonium sulphonate species is formed by a method which enables the co-production of other sulphonate species (for example, tertiary ammonium salts) to be avoided. Examples of such methods include reaction of a metal sulphonate salt with a quaternary ammonium halide; reaction of a sulphonic acid with a quaternary ammonium hydroxide; and reaction of a sulphonate ester with a tertiary amine. The sulphonate salt, sulphonic acid or sulphonate ester may be in momomeric form, and may be any such monomer as described herein. Alternatively, the sulphonate salt, sulphonic acid or sulphonate ester may be in polymeric form and may then be derived from any such monomer as aforesaid.

The quaternary ammonium group can be a tetra-alkyl ammonium group such as tetra-methyl ammonium, tetra-ethyl ammonium or triethyl-methyl ammonium or it can contain one or more cycloalkyl, aryl or aralkyl groups. More generally, the organic groups in the quaternary ammonium moiety may be saturated or unsaturated, aliphatic, cycloaliphatic, aromatic, aliphatic-aromatic, or heterocyclic.

The quaternary ammonium moiety preferably contains at least one organic group containing at least 3 carbon atoms, advantageously at least 8 carbon atoms and preferably from 8 to 25 carbon atoms (for example 8 to 20 carbon atoms), and more especially from 12 to 25 carbon atoms. The polymers containing a relatively long chain quaternary ammonium group have a decreased rate of dissolution in seawater. Moreover, a long-chain quaternary ammonium group released from the polymer has a more pronounced biocidal effect on marine organisms. Examples of such quaternary ammonium groups are dodecyl trimethyl ammonium, hexadecyl trimethyl ammonium, octadecyl trimethyl ammonium, oleyl trimethyl ammonium, benzyl dodecyl dimethyl ammonium, dodecyl dimethyl octyl ammonium or trioctyl methyl ammonium. Mixtures of quaternary ammonium groups can be used; for example an organic group having 8 to 20 carbon atoms can be derived from a naturally occurring material such as a natural fatty material. Examples of such mixed quaternary ammonium groups are trimethyl hydrogenated tallow ammonium, dimethyl di(hydrogenated tallow) ammonium or trimethyl coconut ammonium. The quaternary group can alternatively be derived from rosin, for example it can be N,N,N-trimethyl derivative of the amine sold commercially as "Rosin Amine D", being mainly dehydroabietyl trimethyl ammonium.

Advantageously, the total number of carbon atoms in the quaternary ammonium moiety is 8 or more, preferably 12 or more (for example, from 12 to 25).

In use on a ship in service, the ionic bond between the sulphonic acid group and the quaternary ammonium group is gradually dissociated in seawater, releasing the quaternary ammonium group, for example, in chloride form. The quaternary ammonium salts thus released, particularly those containing an organic group having 8 to 25 carbon atoms (for example, 8 to 20 carbon atoms) may have a biocidal effect against marine organisms. The residual polymer gradually becomes smoothly dissolved from the hull surface in service in seawater, so that a surface of fresh anti-fouling paint is continuously revealed.

It will be appreciated that the term "hydrolysable" is used herein quite generally to refer to a reaction or interaction caused by exposure of the binder polymer to water (especially seawater), and is not intended to imply that the bond between the quaternary ammonium moiety in the binder polymer and the sulphonic acid moiety is other than primarily ionic in character.

The marine biocide is preferably a sparingly soluble metalliferous pigment, particularly a copper or zinc compound. The seawater-erodible polymer of the invention can be mixed with pigment using conventional paint blending procedures to provide an anti-fouling composition having a pigment volume concentration of, for example, 25 to 50%. The pigment preferably has a solubility in seawater of from 0.5 to 10 parts per million by weight, for example cuprous oxide, cuprous thiocyanate, zinc oxide, zinc ethylene bis(dithiocarbamate), zinc dimethyl dithiocarbamate, zinc diethyl dithiocarbamate or cuprous ethylene bis(dithiocarbamate). These pigments produce water-soluble metal compounds on reaction with seawater so that the pigment particles do not survive at the paint surface. Mixtures of sparingly soluble pigments can be used. For example, cuprous oxide, cuprous thiocyanate or zinc ethylene bis(dithiocarbamate), which are highly effective biocidal pigments, can be mixed with zinc oxide, which is less effective as a biocide but dissolves slightly more rapidly in seawater.

The anti-fouling composition can additionally contain pigment which is not reactive with seawater and may be highly insoluble in seawater (solublity below 0.5 part per million by weight), such as titanium dioxide or ferric oxide or an organic pigment such as a phthalocyanine pigment. Such highly insoluble pigments are preferably used at less than 40% by weight of the total pigment content of the paint, most preferably less than 20%.

The anti-fouling composition can contain a non-metalliferous biocide for marine organisms, for example tetramethyl thiuram disulphide, methylene bis-(thiocyanate), captan, a substituted isothiazolone or 2-methylthio-4-t-butylamino-6-cyclopropylamino-s-triazine.

The invention also provides a process for the preparation of an anti-fouling coating composition which comprises a marine biocide and a binder which is a hydrolysable film-forming seawater-erodible polymer, the process comprising incorporating together the binder polymer and the biocide, where appropriate with a suitable solvent or diluent, characterised in that the polymer contains sulphonic acid groups in quaternary ammonium salt form.

The proportion of the binder polymer in a coating composition of the invention may be in the range of from 30 to 70% by weight, preferably from 35 to 50% by weight.

The proportion of the biocide (which is preferably a pigment) in a coating composition of the invention may be in the range of from 40 to 70% by weight, preferably from 40 to 55% by weight.

The proportion of solvent or diluent in a coating composition of the invention may be in the range of from 0 to 30% by weight, preferably from 5 to 15% by weight.

The anti-fouling composition of the invention can contain further components known for use in paints, for example plasticisers, thickening and anti-settling agents, auxiliary film-forming resins and stabilisers against heat or light. For certain uses, for example as an anti-fouling varnish for yachts, the coating composition may have a lower pigment volume concentration than that mentioned above or may contain substantially no pigment.

A representative general formulation of an anti-fouling coating composition according to the invention is as follows:

|  | % by weight | Preferred range |
| --- | --- | --- |
| Quaternary ammonium sulphonate polymer |  | 35–50 |
| Biocide (preferably a pigment) |  | 40–55 |
| Thixotrope(s) | 0–2 | 1–1.5 |
| Colouring agent | 0–10 | Depends on colour |
| Solent or diluent | 0–30 | 5–15 |

The invention also provides a method for treating a surface which comprises applying to the surface a coating composition in accordance with the invention. An especially important use of the method of the invention comprises a process for inhibiting fouling of a ship's hull, which comprises applying to the hull an anti-fouling coating composition in accordance with the invention.

A coating composition of the invention may be applied to a surface by any suitable means, for example by brush, roller or airless spray techniques.

The anti-fouling composition of the invention is generally applied from a solution in an organic solvent. The solvent can for example be the same as that used to prepare the quaternary ammonium salt, optionally diluted for example with an aromatic hydrocarbon such as xylene, toluene or trimethylbenzene. The paint may include an organic-solvent-soluble salt of a polyvalent metal, for example a long-chain carboxylate, as described in European Patent Application 89.310478 (EP-A-0 364 272). Such a metal salt is capable of undergoing a cross-linking reaction with the polymer binder to strengthen the coating and to control its rate of erosion.

The following Examples illustrate the preparation of polymeric quaternary ammonium sulphonate salts for use in coating compositions according to the invention:

I. Preparation of Polymeric Quaternary Ammonium Sulphonate Salts by Treatment of Polymeric Sulphonic Acid Esters with Tertiary Amine I.A. Preparation of Monomeric Sulphonic Acid Esters (i) In a 21 reaction vessel equipped with a stirrer, nitrogen inlet, thermometer and distillation arm, a slurry of 2-acrylamido-2-methylpropanesulphonic acid (621 g), trimethyl orthoformate (853 g), and p-benzoquinone (0.621 g) was maintained at 75°–80° C. for 4½ hours with the reaction by-products, methanol and methyl formate, being removed by distillation. The resulting clear, golden solution was concentrated at reduced pressure to about ⅓ its volume, cooled, and the precipitate collected by filtration. After washing with water and then petroleum ether (60°–80° C. b.p.) the solid was taken up in chloroform, dried with magnesium sulphate and the solution evaporated to give methyl 2-acrylamido-2-methylpropanesulphonate (358 g, 54%) m.p. 80.6° C. MONOMER 1.

(ii) Following the general procedure of Siadat and Lenz, *J. Polym. Sci., Polym. Chem. Ed.*, 18, 3273 (1980), styrenesulphonyl chloride (8.1 g) was dissolved in anhydrous diethyl ether (75 ml) and the solution cooled to −10° C. To this was added methanol (1.5 ml) and powdered potassium hydroxide (5.9 g) over 10 minutes with vigorous stirring and the mixture was allowed to rise to room temperature over 4½ hours. The resultant yellow-orange suspension was poured onto iced-water. This was extracted with ether and the extract washed with water, dried with magnesium sulphate and evaporated to give a yellow oil of methyl styrene sulphonate (4.3 g, 54%), MONOMER 2.

I.B. Preparation of Polymeric Sulphonic Acid Esters

The general procedure was as follows:
Methyl isoamyl ketone (MIAK) (900 g) was introduced into a reaction vessel equipped with a stirrer, nitrogen inlet, thermometer, condenser, and feed inlet. The vessel was heated to 80° C. under an atmosphere of nitrogen and a solution of MONOMER 1 (300 g 15 mol %), methyl methacrylate (362.1 g, 40 mole %), butyl acrylate (521.4 g, 45 mole %), and azobis-isobutyronitrile (AIBN) polymerisation initiator (78.1 g) in MIAK (600 g) was added over 2 hours by means of a peristaltic pump. The reaction temperature was maintained at 80° C. throughout the addition period and thereafter for a further 3½ hours. The resulting solution, having a viscosity of 0.2 poise, was analysed by gel permeation chromatography (GPC) and the polymer, POLYMER 1, was found to have Mn 5 008 and Mw 12 925 (relative to polystyrene standards).

The foregoing procedure was repeated with the materials and proportions as summarised in Table 1 to give polymeric sulphonic acid esters designated POLYMER 2–8. Butanethiol was used where indicated as chain transfer agent in order to control polymer molecular weight.

TABLE 1

Preparation of Polymeric Sulphonic Acid Esters

| POLYMER | FEED CHARGE, g (mole %) | | | | | | | | POT CHRGE, g | | | | VISCOSITY, p |
|---|---|---|---|---|---|---|---|---|---|---|---|---|---|
| | MONOMER 1 | MONOMER 2 | MMA | BA | EMA | MEA | STYRENE | BuSH | MIAK | MIAK | Mn | Mu | |
| 1 | 300 (15) | — | 362.1 (40) | 521.4 (45) | — | — | — | — | 600 | 900 | 5008 | 12925 | 0.2 |
| 2 | 47.8 (10) | — | 97.3 (45) | 124.5 (45) | — | — | — | 10.8 | 120 | 180 | 2821 | 4440 | 0.1 |
| 3 | 25.0 (5) | — | 113.0 (50) | 130.2 (45) | — | — | — | 11.3 | 120 | 180 | 2790 | 4451 | 0.1 |
| 4 | 42.0 (15) | — | 107.7 (85) | — | — | — | — | — | 100 | 140 | 3710 | 8010 | 0.3 |
| 5 | 35.3 (15) | — | — | 116.0 (85) | — | — | — | — | 100 | 140 | 5075 | 13465 | 0.2 |
| 6 | 87.8 (30) | — | — | — | 75.6 (50) | 34.4 (20) | — | — | 120 | 180 | 10532 | 28438 | 3.6 |
| 7 | 76.8 (25) | — | — | — | 103.0 (65) | 18.0 (10) | — | — | 120 | 180 | 12553 | 32010 | 3.8 |
| 8 | — | 22.6 (15) | — | 53.6 (55) | — | — | 23.8 (30) | — | 80 | 110 | 10911 | 26513 | 2.8 |

Key
MMA, methyl methacrylate
BA, butyl acrylate
EMA, ethyl methacrylate
MEA, methoxyethyl acrylate
BuSH, butanethiol
MIAK, methyl isoamyl ketone The following Examples 1 to 21 illustrate the preparation of polymeric quaternary ammonium sulphonate salts from the polymeric sulphonic acid esters designated POLYMERS 1 to 8 in Table 1.

EXAMPLE 1

Cocodimethylamine (58.0 g) was added with stirring to POLYMER 1 solution (500 g), prepared as described above. After 2 hours, infra-red spectroscopic analysis indicated that quantitative transformation of sulphonic acid ester to quaternary ammonium sulphonate salt had occurred, giving a MIAK solution of polymer of composition cocotrimethylammonium 2-acrylamido-2-methylpropanesulphonate (15 mole %), methyl methacrylate (40 mole %), and butyl acrylate (45 mole %).

EXAMPLE 2

The procedure of Example 1 was repeated using POLYMER 1 solution (250 g) and triethylamine (12.5 g) to give a MIAK solution of polymer of composition triethylmethylammonium 2-acrylamido-2-methylpropanesulphonate (15 mole %), methyl methacrylate (40 mole %), and butyl acrylate (45 mole %).

EXAMPLE 3

The procedure of Example 1 was repeated using POLYMER 1 solution (250 g) and tributylamine (22.8 g) to give a MIAK solution of polymer of composition tributylmethylammonium 2-acrylamido-2-methylpropanesulphonate (15 mole %), methyl methacrylate (40 mole %), and butyl acrylate (45 mole %).

EXAMPLE 4

The procedure of Example 1 was repeated using POLYMER 1 solution (250 g) and dimethylaminopropanol (12.7 g) to give a MIAK solution of polymer of composition hydroxypropyltrimethylammonium 2-acrylamido-2-methylpropanesulphonate (15 mole %), methyl methacrylate (40 mole %), and butyl acrylate (45 mole %).

EXAMPLE 5

The procedure of Example 1 was repeated using POLYMER 1 solution (250 g) and tetradecyldimethylamine (29.7 g) to give a MIAK solution of polymer of composition tetradecyltrimethylammonium 2-acrylamido-2-methylpropanesulphonate (15 mole %), methyl methacrylate (40 mole %), and butyl acrylate (45 mole %).

EXAMPLE 6

The procedure of Example 1 was repeated using POLYMER 2 solution (200 g) and triethylamine (7.3 g) to give a MIAK solution of polymer of composition triethylmethylammonium 2-acrylamido-2-methylpropanesulphonate (10 mole %), methyl methacrylate (45 mole %), and butyl acrylate (45 mole %).

EXAMPLE 7

The procedure of Example 1 was repeated using POLYMER 2 solution (200 g) and cocodimethylamine (16.9 g) to give a MIAK solution of polymer of composition cocotrimethylammonium 2-acrylamido-2-methylpropanesulphonate (10 mole %), methyl methacrylate (45 mole %), and butyl acrylate (45 mole %).

EXAMPLE 8

The procedure of Example 1 was repeated using POLYMER 3 solution (200 g) and triethylamine (4.1 g) to give a MIAK solution of polymer of composition triethylmethylammonium 2-acrylamido-2-methylpropanesulphonate (5 mole %), methyl methacrylate (50 mole %), and butyl acrylate (45 mole %).

EXAMPLE 9

The procedure of Example 1 was repeated using POLYMER 3 solution (200 g) and cocodimethylamine (9.5 g) to give a MIAK solution of polymer of composition cocotrimethylammonium 2-acrylamido-2-methylpropanesulphonate (5 mole %), methyl methacrylate (50 mole %), and butyl acrylate (45 mole %).

EXAMPLE 10

The procedure of Example 1 was repeated using POLYMER 4 solution (200 g) and triethylamine (9.6 g) to give a MIAK solution of polymer of composition triethylmethylammonium 2-acrylamido-2-methylpropanesulphonate (15 mole %) and methyl methacrylate (85 mole %).

EXAMPLE 11

The procedure of Example 1 was repeated using POLYMER 4 solution (200 g) and cocodimethylamine (22.3 g) to give a MIAK solution of polymer of composition cocotrimethylammonium 2-acrylamido-2-methylpropanesulphonate (15 mole %) and methyl methacrylate (85 mole %).

EXAMPLE 12

The procedure of Example 1 was repeated using POLYMER 5 solution (200 g) and triethylamine (8.1 g) to give a MIAK solution of polymer of composition triethylmethylammonium 2-acrylamido-2-methylpropanesulphonate (15 mole %) and butyl acrylate (85 mole %).

EXAMPLE 13

The procedure of Example 1 was repeated using POLYMER 5 solution (200 g) and cocodimethylamine (18.8 g) to give a MIAK solution of polymer of composition cocotrimethylammonium 2-acrylamido-2-methylpropanesulphonate (15 mole %) and butyl acrylate (85 mole %).

EXAMPLE 14

The procedure of Example 1 was repeated using POLYMER 6 solution (200 g) and triethylamine (16.1 g) to give a MIAK solution of polymer of composition triethylmethylammonium 2-acrylamido-2-methylpropanesulphonate (30 mole %), ethyl methacrylate (50 mole %), and methoxyethyl acrylate (20 mole %).

EXAMPLE 15

The procedure of Example 1 was repeated using POLYMER 6 solution (200 g) and cocodimethylamine (37.3 g) to give a MIAK solution of polymer of composition cocotrimethylammonium 2-acrylamido-2-methylpropanesulphonate (30 mole %), ethyl methacrylate (50 mole %), and methoxyethyl acrylate (20 mole %).

EXAMPLE 16

The procedure of Example 1 was repeated using POLYMER 7 solution (200 g) and triethylamine (14.1 g) to give a MIAK solution of polymer of composition triethylmethylammonium 2-acrylamido-2-methylpropanesulphonate (25 mole %), ethyl methacrylate (65 mole %), and methoxyethyl acrylate (10 mole %).

EXAMPLE 17

The procedure of Example 1 was repeated using POLYMER 7 solution (200 g) and cocodimethylamine (32.7 g) to give a MIAK solution of polymer of composition cocotrimethylammonium 2-acrylamido-2-methylpropanesulphonate (25 mole %), ethyl methacrylate (65 mole %), and methoxyethyl acrylate (10 mole %).

EXAMPLE 18

The procedure of Example 1 was repeated using POLYMER 8 solution (200 g) and triethylamine (8.1 g) to give a MIAK solution of polymer of composition triethylmethylammonium styrenesulphonate (15 mole %), methyl methacrylate (40 mole %), and butyl acrylate (45 mole %).

EXAMPLE 19

The procedure of Example 1 was repeated using POLYMER 8 solution (200 g) and cocodimethylamine (18.8 g) to give a MIAK solution of polymer of composition cocotrimethylammonium styrenesulphonate (15 mole %), methyl methacrylate (40 mole %), and butyl acrylate (45 mole %).

EXAMPLE 20

N,N,N',N'-Tetramethylbutane-1,4-diamine (8.9 g) was added with stirring to POLYMER 1 solution (250 g). After 2 hours, infra-red spectroscopic analysis indicated that quantitative transformation had occurred to give the polymeric di-quaternary ammonium sulphonate salt.

EXAMPLE 21

N,N,N',N'-Tetramethylethylenediamine (7.2 g) was added with stirring to POLYMER 1 solution (250 g). After 2 hours, infra-red spectroscopic analysis indicated that quantitative transformation had occurred to give the polymeric di-quaternary ammonium sulphonate salt.

II. Preparation of polymeric Quaternary Ammonium Sulphonate Salts by Polymerisation of Monomeric Quaternary Ammonium Sulphonate Salts

II.A. Preparation of Monomeric Quaternary Ammonium Sulphonate Salts (i) Benzyloctyldimethylammonium bromide as a 50 weight % ethanolic solution (183 ml) was added to a solution of sodium styrenesulphonate (50 g) in water. The resulting dense white precipitate was collected by filtration, washed with water, dried and recrystallised from toluene to give benzyloctyldimethylammonium styrenesulphonate (85 g, 81%) MONOMER 3.

(ii) The foregoing procedure was repeated using a solution of sodium styrenesulphonate (5 g) in water (500 ml) and cocobenzyldimethylammonium chloride as a 50 weight % aqueous solution (14.8 ml) to give cocobenzyldimethylammonium styrenesulphonate (9.3 g, 79%) MONOMER 4, after recrystallisation from xylene.

(iii) The foregoing procedure was repeated using a solution of sodium styrenesulphonate (13.2 g) in water (250 ml) and dimethyldistearylammonium chloride as a 75 weight % solution in isopropanol (50 g) to give dimethyldistearylammonium styrenesulphonate (32.7 g, 70%) MONOMER 5, after recrystallisation from xylene.

(iv) Cocodimethylamine (212.7 g) was added dropwise over 30 minutes to a stirred suspension of MONOMER 1 (200 g) in butanol (8.25.4 g) under an atmosphere of nitrogen gas. Infra-red spectroscopic analysis indicated quantitative conversion to cocotrimethylammonium 2-acrylamido-2-methylpropanesulphonate, MONOMER 6.

II.B Polymerisation of Monomeric Quaternary Ammonium Sulphonate Salts

EXAMPLE 22

In a reaction vessel equipped with a stirrer, thermometer, nitrogen inlet, condenser, and feed inlet was placed MONOMER 3 (35.1 g 44.9 mole %) and methyl methacrylate (10.0 g, 55.1 mole %) dissolved in ethanol (80.0 g). The solution was heated to 75° C. under an atmosphere of nitrogen gas and to this was added AIBN (0.9 g) portion-wise over 10 minutes. The temperature was maintained at 75° C. for a further 3 hours by which time refractive index measurement indicated that polymerisation was complete. According to infra-red and proton magnetic resonance spectroscopy, the resulting solution of the corresponding copolymeric quaternary ammonium sulphonate salt was free from detectable vinyl functionality.

EXAMPLE 23

The procedure of Example 22 was repeated using MONOMER 3 (20.0 g 20 mole %) and methyl methacrylate (22.8 g, 80 mole %) in ethanol (100 g) and using AIBN (0.86 g) to give a solution of the corresponding copolymeric quaternary ammonium sulphonate salt.

EXAMPLE 24

The procedure of Example 22 was repeated using MONOMER 3 (23.7 g, 17 mole %), methyl methacrylate (20.2 g, 62 mole %), and butyl acrylate (8.6 g, 21 mole %) in butanol (50 g) and using AIBN (1.05 g) to give a solution of the corresponding copolymeric quaternary ammonium sulphonate salt.

EXAMPLE 25

The procedure of Example 22 was repeated using MONOMER 3 (56.0 g, 14 mole %), methyl methacrylate (65.3 g, 70.3 mole %), and butyl acrylate (18.7 g, 15.7 mole %) in butanol (140 g) and using AIBN (2.8 g) to give a solution of the corresponding copolymeric quaternary ammonium sulphonate salt.

EXAMPLE 26

The procedure of Example 22 was repeated using MONOMER 3 (43.1 g, 10.8 mole %), methyl methacrylate (67.5 g, 72.8 mole %), and butyl acrylate (19.4 g to 16.4 mole %) in butanol (140 g) and using AIBN (2.6 g) to give a solution of the corresponding copolymeric quaternary ammonium sulphonate salt.

EXAMPLE 27

The procedure of Example 22 was repeated using MONOMER 3 (32.3 g, 30 mole %) and styrene (18.2 g, 70 mole %) in butanol (60 g) and using AIBN (1.01 g) to give a solution of the corresponding copolymeric quaternary ammonium sulphonate salt.

EXAMPLE 28

The procedure of Example 22 was repeated using MONOMER 4 (40.0 g, 16.7 mole %), methyl methacrylate (30.0 g, 62.5 mole %), and butyl acrylate (13.0 g, 20.8 mole %) in butanol (83 g) and using AIBN (1.66 g) to give a solution of the corresponding copolymeric quaternary ammonium sulphonate salt.

EXAMPLE 29

The procedure of Example 22 was repeated using MONOMER 4 (40.0 g, 20 mole %) and styrene (34.2 g, 80 mole %) in butanol (74.2 g) and using AIBN (0.74 g) to give a solution of the corresponding copolymeric quaternary ammonium sulphonate salt.

EXAMPLE 30

The procedure of Example 22 was repeated using MONOMER 5 (12.5 g, 17 mole %), methyl methacrylate (6.2 g, 65 mole %), and butyl acrylate (2.7 g, 21 mole %) in butanol (21.4 g) and using AIBN (0.43 g) to give a solution of the corresponding copolymeric quaternary ammonium sulphonate salt.

EXAMPLE 31

The procedure of Example 22 was repeated using MONOMER 5 (15.0 g, 25 mole %) and styrene (6.4 g, 75 mole %) in butanol (21.4 g) and using AIBN (0.21 g) to give a solution of the corresponding copolymeric quaternary ammonium sulphonate salt.

EXAMPLE 32

The procedure of Example 22 was repeated using MONOMER 5 (16.0 g, 17 mole %) and methyl methacrylate (10.7 g, 83 mole %) in butanol (26.7 g) and using AIBN (0.27 g) to give a solution of the corresponding copolymeric quaternary ammonium sulphonate salt.

EXAMPLE 33

Butanol (200 g) was placed in a reaction vessel equipped with a stirrer, nitrogen inlet, thermometer, condenser, and feed inlet. The vessel was heated to 80° C. under an atmosphere of nitrogen gas and a solution of MONOMER 6 in butanol as prepared above (368.8 g, 15 mole %), methyl methacrylate (71.8 g, 40 mole %), butyl acrylate (103.3 g, 45 mole %), and AIBN (5.3 g) was added over 2 hours by means of a peristaltic pump. The reaction temperature was maintained at 80° C. throughout the addition period and thereafter for a further 3½ hours. The resulting copolymeric quaternary ammonium sulphonate salt was found to be spectroscopically indistinguishable from that obtained in Example 1.

FORMULATION EXAMPLE

An anti-fouling composition in accordance with the invention has the following ingredients:

|  | wt % | vol % |
|---|---|---|
| Binder polymer (any of Examples 1-33) | 41.0 | 70.3 |
| Cuprous oxide (biocidal pigment) | 50.0 | 14.4 |
| Bentone 38* | 0.9 | 0.8 |
| Aerosil 200** | 0.5 | 0.3 |
| Toluidine Red (colouring pigment) | 1.5 | 1.8 |
| Methyl isoamyl ketone (solvent) | 6.1 | 12.4 |
|  | 100.0 | 100.0 |

*Mineral clay supplied by Steetly Chemicals
**Air floated silica supplied by Wacker

We claim:

1. An anti-fouling coating composition which comprises an effective anti-fouling amount of a marine biocide and a binder which is a hydrolysable film-forming seawater-erodible polymer, wherein the polymer contains sulphonic acid groups in quaternary ammonium salt form.

2. A composition as claimed in claim 1, wherein said sulphonic acid groups are pendant to a backbone of the binder polymer.

3. A composition as claimed in claim 1, wherein the equivalent weight of the polymer, calculated as free sulphonic acid groups, is in the range of from 600 to 4000.

4. A composition as claimed in claim 1, wherein the binder is based on a copolymer which contains from 3 to 30% by weight of sulphonic acid repeat units.

5. A composition as claimed in claim 1, wherein the binder polymer comprises from 3 to 30 mole % of quaternary ammonium sulphonate repeat units.

6. A composition as claimed in claim 5, wherein the binder polymer comprises (a) less than 12.5 mole % of quaternary ammonium sulphonate repeat units, or (b) more than 15 mole % of said units.

7. A composition as claimed in claim 1, wherein the binder is based on a sulphonic acid copolymer having a number average molecular weight in the range of from 1000 to 50000.

8. A composition as claimed in claim 1, wherein the binder is based on a sulphonic acid copolymer having a weight average molecular weight in the range of from 1000 to 200 000.

9. A composition as claimed in claim 1, wherein the binder polymer is substantially free from sulphonate species other than quaternary ammonium sulphonate species.

10. A composition as claimed in claim 1, wherein the binder polymer is based on sulphonic acid repeat units other than styrene sulphonic acid repeat units.

11. A composition as claimed in claim 1, wherein the sulphonic acid groups in quaternary ammonium salt form have a quaternary ammonium moiety that comprises at least one organic group containing from 3 to 25 carbon atoms.

12. A composition as claimed in claim 1, wherein the sulphonic acid groups in quaternary ammonium salt form have a quaternary ammonium moiety that has a total of from 8 to 25 carbon atoms.

13. A composition as claimed in claim 1, wherein the binder polymer is present in an amount of from 30 to 70% by weight of the composition.

14. A composition as claimed in claim 1, wherein the biocide is present in an amount of from 40 to 70% by weight of the composition.

15. A composition as claimed in claim 1, wherein said composition comprises from 0 to 30% by weight of a solvent or diluent.

16. A method for treating a surface which comprises applying to the surface the coating composition as defined in claim 1.

17. A process for inhibiting fouling of a ship's hull, which comprises applying to the hull the composition as defined in claim 1.

18. The composition as claimed in claim 1, wherein the binder polymer is based on sulphonic acid repeat units other than aromatic sulphonic acid repeat units.

19. The composition as claimed in claim 14 wherein said biocide is a pigment.

* * * * *